(12) United States Patent
Gerber et al.

(10) Patent No.: US 12,358,094 B2
(45) Date of Patent: Jul. 15, 2025

(54) SYSTEM FOR CHIP-REMOVING MACHINING OF A WORKPIECE AND FOR MEASURING AND EVALUATING FORCE AND TORQUE DURING CHIP-REMOVING MACHINING OF THE WORKPIECE

(71) Applicant: Kistler Holding AG, Winterthur (CH)

(72) Inventors: Christian Gerber, Seuzach (CH); Gunnar Keitzel, Hettlingen (CH)

(73) Assignee: Kistler Holding AG, Winterthur (CH)

( * ) Notice: Subject to any disclaimer, the term of this patent is extended or adjusted under 35 U.S.C. 154(b) by 318 days.

(21) Appl. No.: 17/884,656

(22) Filed: Aug. 10, 2022

(65) Prior Publication Data
US 2023/0052650 A1    Feb. 16, 2023

(30) Foreign Application Priority Data
Aug. 13, 2021   (EP) .................................... 21191259

(51) Int. Cl.
*B23Q 17/20*   (2006.01)
*B23Q 11/00*   (2006.01)

(52) U.S. Cl.
CPC .......... *B23Q 17/20* (2013.01); *B23Q 11/0042* (2013.01)

(58) Field of Classification Search
CPC . B23Q 17/20; B23Q 11/0042; B23Q 17/0966
USPC ....................................................... 702/182
See application file for complete search history.

(56) References Cited

U.S. PATENT DOCUMENTS

| | | | |
|---|---|---|---|
| 9,347,839 B2 | 5/2016 | Kohler | |
| 10,070,203 B2 | 9/2018 | Busslinger | |
| 11,123,862 B2* | 9/2021 | Ottnad | ................. B25J 15/0616 |
| 2014/0140781 A1* | 5/2014 | Sjoo | ...................... B23F 21/166 |
| | | | 408/8 |

(Continued)

FOREIGN PATENT DOCUMENTS

| | | |
|---|---|---|
| DE | 102015220533 A1 | 4/2017 |
| JP | 2001 251692 A | 9/2001 |

(Continued)

OTHER PUBLICATIONS

Foreign office action for JP application No. 2022-105236, mail date of Jul. 28, 2023, 6 pages.

(Continued)

*Primary Examiner* — Aditya S Bhat
(74) *Attorney, Agent, or Firm* — Dority & Manning, P.A.

(57) ABSTRACT

A system for chip-removing machining of a workpiece and for measuring and evaluating force and torque during the chip-removing machining of the workpiece includes a machine tool with a tool for chip-removing machining of the workpiece; a device for measuring force and torque that includes a plurality of piezoelectric transducers generating polarization charges being communicated through a respective measuring channel; and a stationary evaluation unit for evaluating measured value data of the device. The device includes a measuring unit installed in the machine tool and rotates with the tool about an axis of rotation during chip-removing machining. The device includes a control unit that transmits measured values as measured value data in a wireless manner directly to the evaluation unit with a transmission power in the range of 0.1 mW to 10 mW.

15 Claims, 3 Drawing Sheets

(56) References Cited

U.S. PATENT DOCUMENTS

2018/0145541 A1* 5/2018 Taya .................. H02J 50/12

FOREIGN PATENT DOCUMENTS

| JP | 2000251692 A | 9/2001 |
| --- | --- | --- |
| JP | 2010061487 A | 3/2010 |
| JP | 2017140687 A | 8/2017 |
| JP | 2017 156285 A | 9/2017 |
| JP | 2019530880 A | 10/2019 |
| KR | 20170098780 A | 8/2017 |
| WO | WO 2010/098040 A1 | 9/2010 |
| WO | WO 2018151805 A1 | 8/2018 |

OTHER PUBLICATIONS

JP Office Action with Translation, Dec. 4, 2023, 8 pages.
European Search Report for EP application No. 21191259.7, mail date of Jan. 26, 2022.
Kistler Gruppe, 4-Component Dynamometer (RCD) Rotating—for measuring cutting forces on a rotating tool, Datasheet 9170A_000-995d-08.19, Winterthur, Schweiz, retrieved from the internet: https://www.kistler.com/files/document/000-995d.pdf, 2013-2019, pp. 1-6.
Kistler Gruppe, Kistler LabAmp—Charge Amplifier and Data Acquisition Unit for Dynamic Measurements, Datasheet 5165A_003-146d-10.20, Winterthur, Schweiz, retrieved from the internet: http://www.kistler.com/files/document/003-146d.pdf, 2014-2019, pp. 1-5.
JP Office Action with Translation, Oct. 23, 2024, 10 pages.

* cited by examiner

SYSTEM FOR CHIP-REMOVING MACHINING OF A WORKPIECE AND FOR MEASURING AND EVALUATING FORCE AND TORQUE DURING CHIP-REMOVING MACHINING OF THE WORKPIECE

CROSS-REFERENCE TO RELATED APPLICATIONS

Not applicable.

TECHNICAL FIELD

The invention relates to a system for chip-removing machining of a workpiece and for measuring and evaluating force and torque during chip-removing machining of the workpiece.

BACKGROUND OF THE INVENTION

A machine tool is commonly used for chip-removing machining of a workpiece which includes a spindle, a tool holder, and a tool. The tool is mounted in the tool holder and the tool holder is mounted on the spindle. The spindle rotates the tool holder and the tool about an axis of rotation. In the process, the rotating tool reaches into the workpiece and mechanically lifts off material from the workpiece in the form of chips. In this way, the workpiece is given a defined shape. Chip-removing machining includes turning, drilling, milling, etc.

To monitor the quality of chip-removing machining, the force and torque exerted by the rotating tool onto the workpiece are measured and evaluated. To accurately measure force and torque, a device is placed as close as possible to the rotating tool.

Such a device is marketed by the applicant which is a type 9170A 4-component dynamometer according to data sheet 9170A_000-995d-08.19 and with aspects thereof described in U.S. Pat. Nos. 9,347,839 and 10,070,203, which patents are hereby incorporated herein in their entireties by this reference for all purposes. The 4 type 9170A-component dynamometer comprises a rotor unit, a stator unit and a connecting cable. The rotor unit is installed in the machine tool in place of the tool holder. For this purpose, the tool is attached to the rotor unit via a tool adapter and the rotor unit is attached to the spindle via a spindle adapter. The rotor unit thus rotates together with the tool during chip-removing machining and measures three force type components along three axes that are perpendicular to each other and one torque type component about the axis of rotation. The rotor unit generates measured value data for the measured force and torque components. The stator unit is stationary and positioned close to the rotor unit from which it is spaced apart by an air gap of a few millimeters in width. Through the air gap, the stator unit supplies electric energy to the rotor unit in a wireless manner. Through the air gap, the rotor unit transmits the measured value data to the stator unit in a wireless manner. From the stator unit, the connecting cable transmits the measured value data to a remote evaluation unit that is also stationary. The evaluation unit evaluates the measured value data. The machine tool, the device, and the evaluation unit form a system.

The type 9170A 4-component dynamometer measures each component type of force and torque in a separate measuring channel. For this purpose, the type 9170A 4-component dynamometer uses piezoelectric transducers which generate measured values in the form of electric polarization charges under the effect of the force and torque component type. Piezoelectric transducers enable a high sampling rate. The type 9170A 4-component dynamometer measures the component type of force and torque per measuring channel with a sampling rate of 22.2 kHz. The sampling rate indicates the temporal accuracy of the measured values. The rotor unit digitizes the measured values and obtains measured value data. The measured value data have a 12 bit resolution. The resolution provides the level of accuracy of the measured value data.

However, customers nowadays want a system that measures force and torque with even greater accuracy. In this way, force and torque can be measured at high rotational speeds and detecting at least one measured value per rotation of the rotor unit with even higher levels of accuracy enabling even more accurate determinations of the condition of the tool, such as wear, changes in force and torque, etc., to be made in real time.

Furthermore, customers want a system comprising a device without a stator unit and without connecting cable. The reason is that there is not much space available at the machine tool especially with small tools and small tool diameters making it difficult or even impossible to position the stator unit close to the rotor unit. Moreover, the connecting cable must be carefully guided through the workshop of the machine tool to protect it from damage and, thus, failure of the system. However, the positioning of the stator unit close to the rotor unit and installing the connecting cable in the workshop increases the setup time of the system and makes chip-removing machining of the workpiece more expensive.

Finally, customers demand the provision of a system that further exhibits an uninterrupted operation time of at least 8 h to enable cost-effective chip-removing machining of the workpiece. The device should be able to measure force and torque during a measuring time of at least 4 h within this operating time of at least 8 h without having to interrupt operation of the system for transmitting measured value data or supplying electric energy to the device.

OBJECTS AND SUMMARY OF THE INVENTION

It is a first object of the present invention to provide a system for chip-removing machining of a workpiece and for measuring and evaluating force and torque during chip-removing machining of the workpiece, said system being able to measure the force and torque with high accuracy.

It is a second object of the invention to disclose a system for chip-removing machining of a workpiece and for measuring and evaluating force and torque during chip-removing machining the workpiece, which system does not require a stator unit and a connecting cable.

Furthermore, a third object of the invention intends to provide a system for chip-removing machining of a workpiece, which system provides an uninterrupted operation time of at least 8 h.

These objects and others have been achieved by the features described hereinafter.

The invention relates to a system for chip-removing machining of a workpiece and for measuring and evaluating force and torque during chip-removing machining of the workpiece; which system comprises a machine tool for chip-removing machining of the workpiece by a tool, a device for measuring force and torque during the chip-removing machining of the workpiece, and an evaluation unit for evaluating measured value data of the device;

wherein said device is installed in the machine tool and rotates with the tool about an axis of rotation during the chip-removing machining operation; wherein said evaluation unit is stationary; wherein said device comprises a measuring unit, which measuring unit generates measured values under the action of the force and torque component types acting during the chip-removing machining operation; wherein said device comprises a control unit, which control unit transmits the measured values in the form of measured value data directly to the evaluation unit in a wireless manner; wherein said wireless transmission of the measured value data takes place with a transmission power in the range from 0.1 mW to 10 mW.

According to a first aspect of the invention, in contrast to the type 9170A 4-component dynamometer the device no longer comprises a stator unit or a connection cable in the measurement chain between the rotor unit and the evaluation unit. Instead, the device transmits the measured value data directly to the evaluation unit in a wireless manner. Therefore, the number of components of the measurement chain is dramatically reduced. However, since the stator unit is omitted wireless power supply of the device is also no longer possible. According to a further aspect of the invention, the device therefore has a significantly lower transmission power of more than one order of magnitude less than the type 9170A 4-component dynamometer. As a result, the energy consumption during operation of the device is reduced by more than one order of magnitude. Therefore, the device only requires an energy storage device with such small external dimensions and low weight sufficient to maintain an uninterrupted operation of the system for at least 8 h.

Preferred embodiments of the invention are claimed in the dependent claims. In addition, the features of the dependent claims also achieve at least one of the objects.

In a preferred embodiment, the measured value data are binary number sequences with 16 bit resolution.

A 16 bit resolution of the measured values is significantly more accurate than the 12 bit resolution of the measured values that is possible with the type 9170A 4-component dynamometer. The difference of 4 bit corresponds to a factor of $2^4$ or 16.

In a further preferred embodiment, wireless transmission of the measured value data occurs with a data transmission rate of optionally 1 Mbit/sec or 2 Mbit/sec, wherein the evaluation unit selects the data transmission rate, by means of which selected data transmission rate the wireless transmission of the measured value data takes place.

A high data transmission rate of 2 Mbit/sec is not always necessary, often a low data transmission rate of 1 Mbit/sec is sufficient as well. A high data transmission rate is necessary when a large amount of measured value data is to be transmitted in a wireless manner. However, with the high data transmission rate the energy consumption of the device is at least 10% higher as compared to the low data transmission rate. Thus, the evaluation unit determines whether a high data transmission rate is actually necessary and, thus, keeps the energy consumption of the device low.

In another preferred embodiment, the evaluation unit comprises an evaluation transmitting/receiving unit, which evaluation transmitting/receiving unit comprises an antenna and receives the measured value data from the control unit via the antenna in the form of electromagnetic waves; wherein said evaluation transmitting/receiving unit is arranged in a separate housing; and wherein the housing may be spatially aligned with respect to the control unit for wireless transmission of the measured value data.

Due to the fact that the evaluation transmitting/receiving unit is arranged in its own housing separate from the evaluation unit, the antenna of the evaluation transmitting/receiving unit may be spatially aligned with respect to an antenna of the control unit in an easy and quick manner. As a result, the wireless transmission of the measured value data takes place with antennas that are aligned in the best possible way and, thus, with low transmission power keeping the energy consumption of the device low and furthermore keeping the quality of the wireless transmission of the measured value data high which in turn increases the accuracy of the force and torque measurement.

In another preferred embodiment, the evaluation unit comprises a temporary data memory; wherein the evaluation unit stores measured value data wirelessly transmitted by the control unit in the temporary data memory; and wherein the evaluation unit reads the temporary data memory optionally in a buffer mode or in a streaming mode.

In the buffer mode, the evaluation unit enters the wirelessly transmitted measured value data for a period of time into the temporary random-access memory and reads them according to the First In-First Out principle. Thus, during the entering period the control unit has the opportunity to repeat the transmission of measured value data which have not been transmitted in a wireless manner, thus, increasing the probability that the measured value data read according to the First In-First Out principle are complete. It should be understood that measured value data transmitted in completeness provide a higher accuracy of the evaluation than measured value data that were incompletely transmitted. However, if the completeness of the measured value data is of only secondary importance during evaluation and immediate evaluation is of greater importance, the evaluation unit will directly read the temporary random-access memory in the streaming mode.

In still another preferred embodiment, the control unit compresses the measured value data before they are transmitted to the evaluation unit in a wireless manner; and wherein the evaluation unit decompresses the wirelessly transmitted measured value data.

Compression reduces the amount of measurement value data such that a reduced amount of measurement value data is to be transmitted to the evaluation unit in a wireless manner. The reduced amount of measurement value data requires a low data transmission rate which keeps the power consumption of the device low.

In still another preferred embodiment, the control unit transmits the measured value data in a wireless manner to the evaluation unit without calibrating it; wherein calibration data are stored in the evaluation unit; wherein the calibration data correct a linearity error of the measured values; and wherein the evaluation unit calibrates the wirelessly transmitted measured value data with the calibration data.

The calibration corrects a linearity error of the measured values. However, by having the evaluation unit perform the calibration of the measured values the power consumption of the device is also reduced.

In still another preferred embodiment, a number of measuring channels in which the measurement unit generates measurement values may be set; the component types of force and torque for which the measurement unit generates measurement values may also be set; and wherein an adjustment of the number of measuring channels and of the component types of force and torque is performed by said evaluation unit.

It is not always necessary to perform the measurement of force and torque by all available measuring channels and not always for all component types of force and torque. Depending on the type of chip-removing machining a subset of the measuring channels available may be sufficient to monitor the quality of the chip-removing machining. To the extent that the number of measuring channels available is reduced, the energy consumption of the device is also reduced.

In still another preferred embodiment, the control unit converts the measured values into amplified measured values of a measurement range; wherein the measurement range including the amplified measured values may be set; wherein the evaluation unit generates control data containing an information about the measurement range to be set; wherein the evaluation unit transmits the control data with the information about the measurement range to be set in a wireless manner to the testing device; and wherein the testing device adjusts the measurement range to be set and converts the measured values into the set measurement range.

With amplification of the measurement values, the amplified measured values are displayed in a measurement range. Monitored as to whether the amplified measured values are within predefined threshold values of the measurement range must be carried out to achieve the best possible representation of the amplified measured values in a measurement range. The fact that the evaluation unit carries out this monitoring reduces the energy consumption of the device.

BRIEF DESCRIPTION OF THE SEVERAL VIEWS OF EXEMPLARY DRAWINGS

In the following, the invention will be explained in more detail by way of example with reference to the figures in which.

DETAILED DESCRIPTION OF EXEMPLARY EMBODIMENTS OF THE INVENTION

Figure 1:
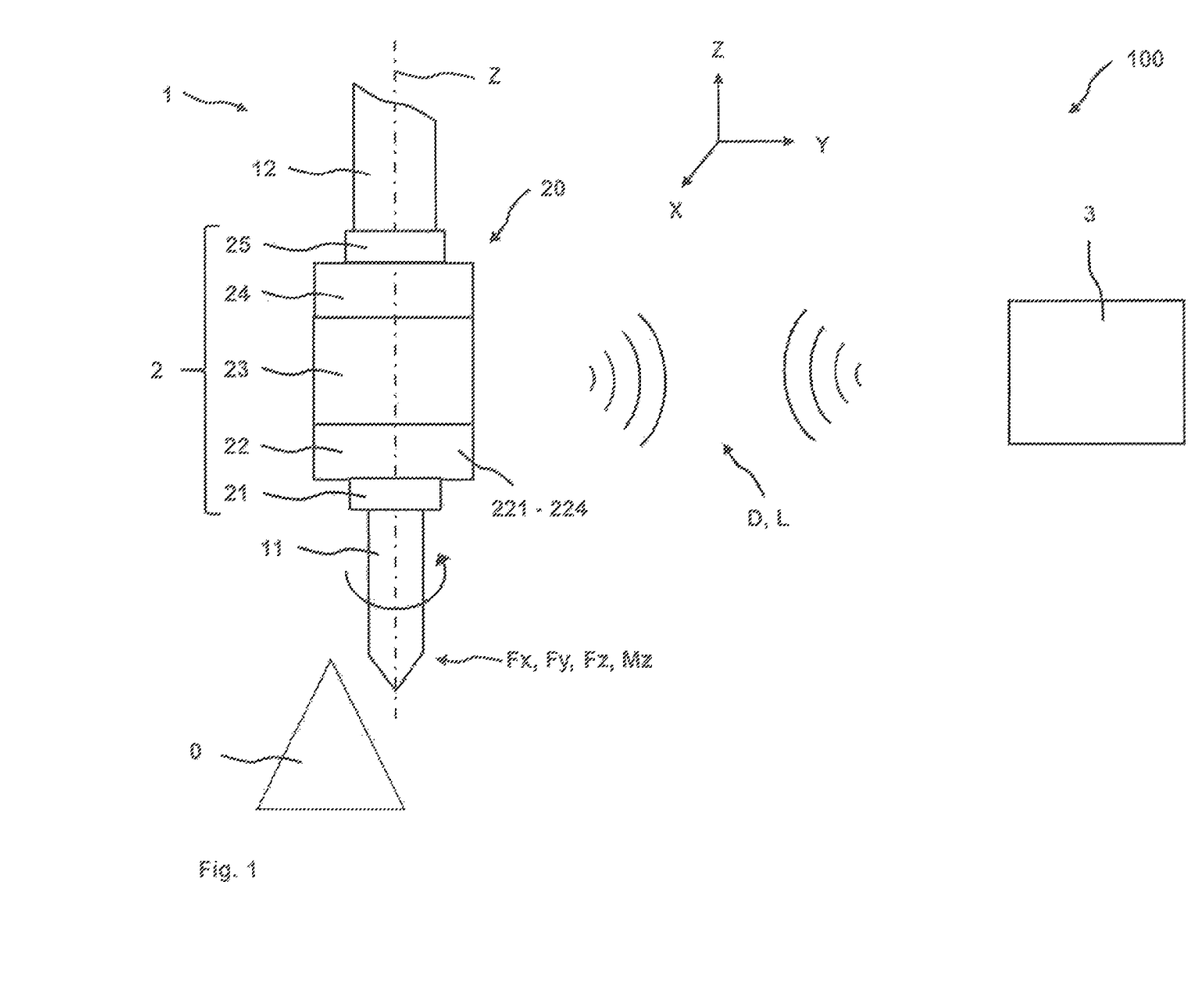
FIG. 1 shows a schematic representation of a portion of the system 100 comprising a machine tool 1, a device 2 and an evaluation unit 3.

FIG. 1 schematically shows a system that is generally designated by the numeral 100 for chip-removing machining of a workpiece 0 and for measuring and evaluating force and torque during chip-removing machining of the workpiece 0. The system 100 comprises a machine tool that is generally designated by the numeral 1 for chip-removing machining of the workpiece 0, a multi-component device 2 for measuring force and torque during chip-removing machining of the workpiece 0, and an evaluation unit 3 for evaluating the measured value data MD of the device 2.

Only a portion of the machine tool 1 is schematically shown in FIG. 1. A tool 11 and a spindle 12 are portions of the machine tool 1 visible in FIG. 1. The machine tool 1 drives the spindle 12 to rotate about an axis of rotation Z during chip-removing machining of the workpiece 0. A drive for driving the spindle 12 is conventional in the art and not shown.

The device 2 in accordance with the present invention is installed in the machine tool 1. The device 2 comprises a tool adapter 21 and a spindle adapter 25. The tool 11 is attached to the device 2 via the tool adapter 21, and the device 2 is attached to the spindle 12 via the spindle adapter 25. Tool 11, device 2, and spindle 12 are rigidly connected to each other to rotate in unison about an axis of rotation Z. The rotation of tool 11, device 2, and spindle 12 about axis of rotation Z is schematically shown as a curved arrow in FIG. 1.

The device 2 comprises a housing that is generally designated in FIG. 1 by the numeral 20. The tool adapter 21 and the spindle adapter 25 are attached to the outside of the housing 20. In a presently preferred embodiment, the spindle adapter 25 comprises a quick release coupling so that the fastening of the device 2 to the spindle 12 may be quickly released from the spindle 12 and reattached within seconds.

The housing 20 defines a cavity internally of the housing 20. The device 2 comprises a measuring unit 22, a control unit 23, and an energy storage unit 24. The measuring unit 22, control unit 23 and energy storage unit 24 are arranged in the cavity. The housing 20 is mechanically stable and constructed to be sealed from fluid, thus protecting the measuring unit 22, control unit 23, and energy storage unit 24 from external influences occurring during chip-removing machining, such as coolant, lubricants, chips, etc.

The device 2 measures three force component types Fx, Fy, Fz of one torque component type Mz. A first component type Fx of the force acts along a longitudinal axis that is represented in FIG. 1 by the arrow designated by the letter X, a second component type Fy of the force acts along a transverse axis that is represented in FIG. 1 by the arrow designated by the letter Y, a third component type Fz of the force acts along an axis of rotation that is represented in FIG. 1 by the arrow designated by the letter Z, and the torque component type Mz acts circumferentially around the axis of rotation Z. The three axes X, Y, Z are perpendicular to each other. In the following explanation, the three force component types Fx, Fy, Fz and the torque component type Mz will be referred to simply as the component types Fx, Fy, Fz, Mz of force and torque.

The actual measurement of the component types Fx, Fy, Fz, Mz of force and torque is performed by the measuring unit 22. It is the measuring unit 22 that is configured to generate measured values P under the action of the component types Fx, Fy, Fz, Mz of force and torque to be measured. The measured values P are analog signals generated by the measuring unit 22. The magnitudes of the measured values P are substantially proportional to the magnitudes of the component types Fx, Fy, Fz, Mz of force and torque.

Measurement unit 22 desirably comprises a plurality of transducers 221-224. Each of the transducers 221-224 functions independently of each other transducer 221, 222, 223, 224. In the sense of the present invention, the characteristic "independent of each other" means that the transducers 221-224 do not influence each other and that, furthermore, they are not dependent on each other. Thus, the measuring unit 22 comprises a first transducer 221 that is configured and disposed to generate measured values P under the effect of the first component type Fx of the force. The second transducer 222 is configured and disposed to generate measured values P under the effect of the second component type Fy of the force. The third transducer 223 is configured and disposed to generate measured values P under the effect for measuring the third component type Fz of the force. The fourth transducer 224 is configured and disposed to generate measured values P under the effect of the torque component type Mz.

Measurement unit 22 generates the measurement values P in a plurality of measuring channels K1-K4. Each of the measuring channels K1, K2, K3, K4 is independent of each other measuring channel K1, K2, K3, K4. The characteristic "independent of each other" in the sense of the present invention means that the measuring channels K1-K4 do not influence each other and that they are not dependent on each other. A respective one of the measuring channels K1-K4 is individually and exclusively assigned to a respective one of the transducers 221-224. The first transducer 221 generates measured values P in a first measuring channel K1. The second transducer 222 generates measured values P in a second measuring channel K2. The third transducer 223 generates measured values P in a third measuring channel K3. The fourth transducer 224 generates measured values P in a fourth measuring channel K4. Thus, each respective component type Fx, Fy, Fz, Mz of force and torque is assigned in a clearly defined manner to a its own respective measuring channel K1-K4.

In A deviation from the proportionality between the measured value P and the correct value according to DIN 1319-1 the magnitude of the component types Fx, Fy, Fz, Mz of force and torque is called linearity error. The linearity error is in the range of 5% to 10%. The amount of linearity error is different for each component type Fx, Fy, Fz, Mz of force and torque.

In a presently preferred embodiment, the transducers 221-224 are piezoelectric transducers 221-224. The piezoelectric transducers 221-224 generate measured values P in the form of electric polarization charges P1-P4 under the action of the component types Fx, Fy, Fz, Mz of force and torque. The number of electric polarization charges P1-P4 is substantially proportional to the magnitude of the component types Fx, Fy, Fz, Mz of force and torque. The first piezoelectric transducer 221 generates first electric polarization charges P1 in the first measuring channel K1. The second piezoelectric transducer 222 generates second electric polarization charges P2 in the second measuring channel K2. The third piezoelectric transducer 223 generates third electric polarization charges P3 in the third measuring channel K3. The fourth piezoelectric transducer 224 generates fourth electric polarization charges P4 in the fourth measuring channel K4.

Alternatively, the measurement unit 22 comprises a plurality of force and torque measuring transducers 221-224 that operate according to a measurement principle other than piezoelectricity, such as piezoresistive transducers, strain gauges (DMS), and the like. These alternative transducers 221-224 generate measured values P in the form of electric voltages.

Piezoelectric transducers 221-224 allow for a high sampling rate. In a presently preferred embodiment, the sampling rate of the piezoelectric transducers 221-224 in each measuring channel K1-K4 is in a range of 5 kHz to 10 kHz, which sampling rate is higher by a factor of five as compared to that of strain gauge transducers 221-224. Moreover, the resolution in force/time diagrams, torque/time diagrams, and also in force polar diagrams, of measured value data MP originating from piezoelectric transducers 221-224 is improved by a factor of ten as compared to those generated by strain gauge transducers 221-224.

The energy storage unit 24 includes at least one electric energy storage device such as a rechargeable battery, a non-rechargeable battery, etc. Preferably, the energy storage unit 24 is a lithium-ion accumulator, a lithium-polymer accumulator, a zinc-air battery, etc. The energy storage unit 24 is small in size and light in weight.

Figure 2:
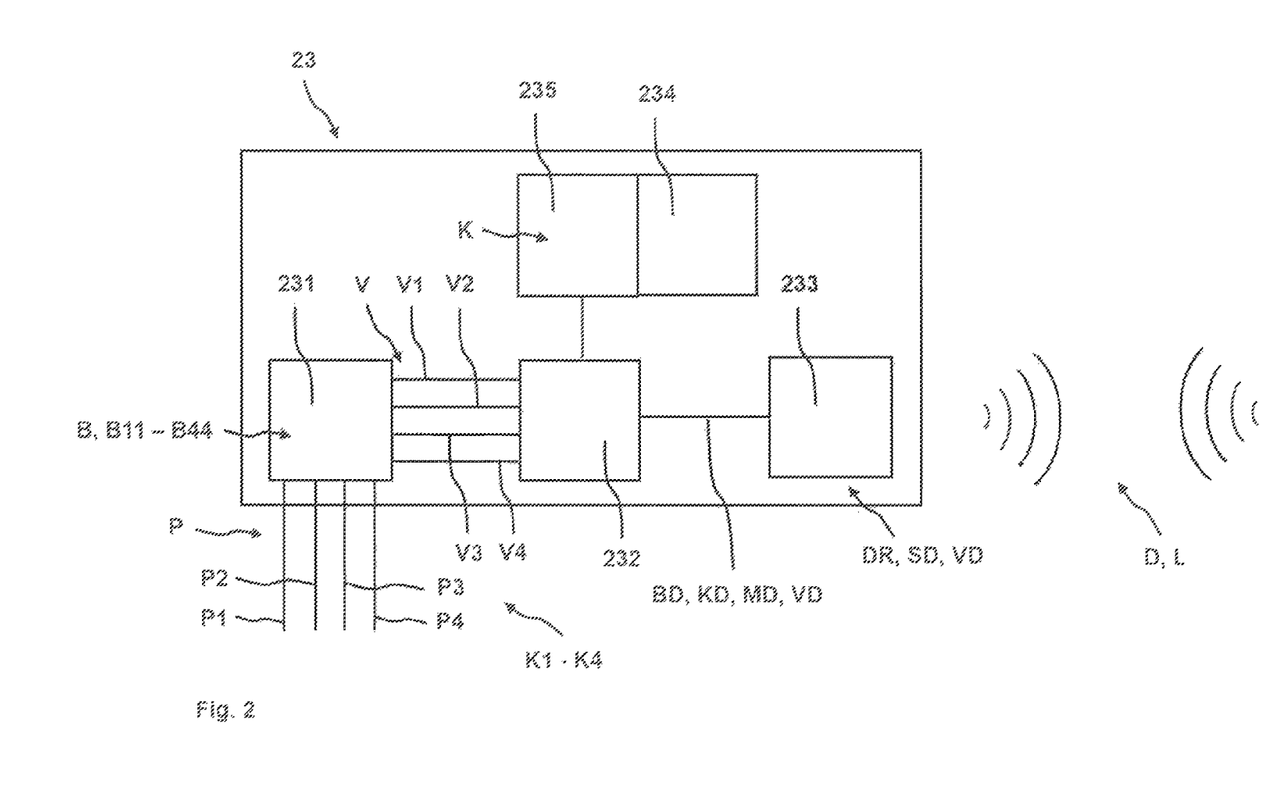
FIG. 2 shows a schematic representation of a control unit 23 of the device 2 of FIG. 1.

FIG. 2 schematically shows a detailed view of the control unit 23. The control unit 23 comprises at least a control voltage converting unit 231, at least a control analog/digital converting unit 232, at least a control transmitting/receiving unit 233, at least a control data memory 234, and at least a control data processor 235.

The control voltage converting unit 231 is electrically connected to the measurement unit 22 via a plurality of first electric lines. The control analog/digital converting unit 232 is electrically connected to the control voltage converting unit 231 via a plurality of further electric lines.

The control unit 23 is configured to convert the measured values P of the measuring unit 22 into measured value data MD. For this purpose, the measuring unit 22 is configured to transmit the measured values P via the first electric lines to the control voltage converting unit 231. The control voltage converting unit 231 is configured to convert the measured values P into amplified measured values V. The control voltage converting unit 231 is configured to transmit the amplified measured values V via the further electric lines to the control analog/digital converting unit 232. The control analog/digital converting unit 232 is configured to digitize the amplified measured values V to obtain measured value data KD.

The measured value data KD are binary number sequences with a resolution of preferably 16 bit per measuring channel K1-K4.

In a presently preferred embodiment, the amplified measured values V are electric voltages V1-V4. In the first measuring channel K1, the control voltage converting unit 231 transmits first electric voltages V1 via a first electric supply line to the control analog/digital converting unit 232. The control analog/digital converting unit 232 then digitizes the first electric voltages V1 to obtain measured value data KD. In the second measuring channel K2, the control voltage converting unit 231 transmits second electric voltages V2 via a second electric supply line to the control analog/digital converting unit 232. The control analog/digital converting unit 232 then digitizes the second electric voltages V2 to obtain measured value data KD. In the third measuring channel K3, the control voltage converting unit 231 transmits third electric voltages V3 to the control analog/digital converting unit 232 via a third electric supply line. The control analog/digital converting unit 232 then digitizes the third electric voltages V3 to obtain measured value data KD. In the fourth measuring channel K4, the control voltage converting unit 231 transmits fourth electric voltages V4 to the control analog/digital converting unit 232 via a fourth electric supply line. The control analog/digital converting unit 232 then digitizes the fourth electric voltages V4 to obtain measured value data KD.

The control unit 23 generates measuring channel data KD unequivocally designating the measuring channel K1-K4 in which the measurement unit 22 has generated measurement values K. For this purpose, the control analog/digital converting unit 232 generates digital measuring channel data KD unequivocally designating the measuring channel K1-K4 for which it has digitized amplified measured values V into measurement value data PD.

The control unit 23 amplifies the measured values P to obtain amplified measured values V which are in a measurement range B. The measurement range B of the amplified measured values V may be set. The control unit 23 generates measurement range data BD unequivocally designating the measurement range B of the amplified measured values V. The control voltage converting unit 231 generates analog measurement range signals B11-B44, unequivocally designating the measurement range B of the amplified measured values V. A measurement range signal B11-B44 is assigned to each measurement range B. The control voltage converting unit 231 transmits the measurement range signals B11-B44 via the further electric lines to the control analog/digital converting unit 232. The control analog/digital converting unit 232 digitizes the measurement range signals B11-B44 to obtain measurement range data BD.

In a presently preferred embodiment, the control voltage converting unit 231 represents the first component type Fx of the force in the first measuring channel K1 in a first measurement range B11 with a final value of 500N, in a second measurement range B12 with a final value of 1 kN, in a third measurement range B13 with a final value of 2.5 kN, and in a fourth measurement range B14 with a final value of 5 kN. In a presently preferred embodiment, the control voltage converting unit 231 represents the second component type Fy of the force in the second measuring channel K2 in a first measurement range B21 with a final value of 500N, in a second measurement range B22 with a final value of 1 kN, in a third measurement range B23 with a final value of 2.5 kN, and in a fourth measurement range B24 with a final value of 5 kN. In a presently preferred embodiment, the control voltage converting unit 231 represents the third component type Fz of force in the third measuring channel K3 in a first measurement range B31 with a final value of 2.5 kN, in a second measurement range B32 with a final value of 5 kN, in a third measurement range B33 with a final value of 10 kN, and in a fourth measurement range B34 with a final value of 20 kN. In a presently preferred embodiment, the control voltage converting unit 231 represents the component type Mz of the torque in the fourth measuring channel K4 in a first measurement range B41 with a final value of 10 Nm, in a second measurement range B42 with a final value of 20 Nm, in a third measurement range B43 with a final value of 50 Nm, and in a fourth measurement range B44 with a final value of 100 Nm.

In a presently preferred embodiment, the measuring unit 22 transmits measured values P in the form of electric polarization charges P1-P4 in four measuring channels K1-K4 simultaneously to the control voltage converting unit 231. The control voltage converting unit 231 converts the electric polarization charges P1-P4 in the four measuring channels K1-K4 simultaneously into amplified measured values V in the form of electric voltages V1-V4.

In the first measuring channel K1, the first piezoelectric transducer 221 transmits first electric polarization charges P1 to the control voltage converting unit 231 via a first electric supply line, and the control voltage converting unit 231 converts the first electric polarization charges P1 into first electric voltages V1. In the second measuring channel K2, the second piezoelectric transducer 222 transmits second electric polarization charges P2 to the control voltage converting unit 231 via a second electric supply line, and the control voltage converting unit 231 converts the second electric polarization charges P2 into second electric voltages V2. In the third measuring channel K3, the third piezoelectric transducer 223 transmits third electric polarization charges P3 to the control voltage converting unit 231 via a third electric supply line, and the control voltage converting unit 231 converts the third electric polarization charges P3 into third electric voltages V3. In the fourth measuring channel K4, the fourth piezoelectric transducer 224 transmits fourth polarization electric charges P4 to the control voltage converting unit 231 via a fourth electric supply line, and the control voltage converting unit 231 converts the fourth polarization electric charges P4 into fourth electric voltages V4.

The control unit 23 comprises at least one control program K which is stored in the control data memory 234 and may be loaded into the control data processor 235. The control program K loaded into the control data processor 235 generates commands, which commands are automatically executed by the control unit 23. In the sense of the invention, the adjective "automatic" means that the commands generated by the control program K are executed by the control unit 23 without involvement of a human being.

Figure 3:
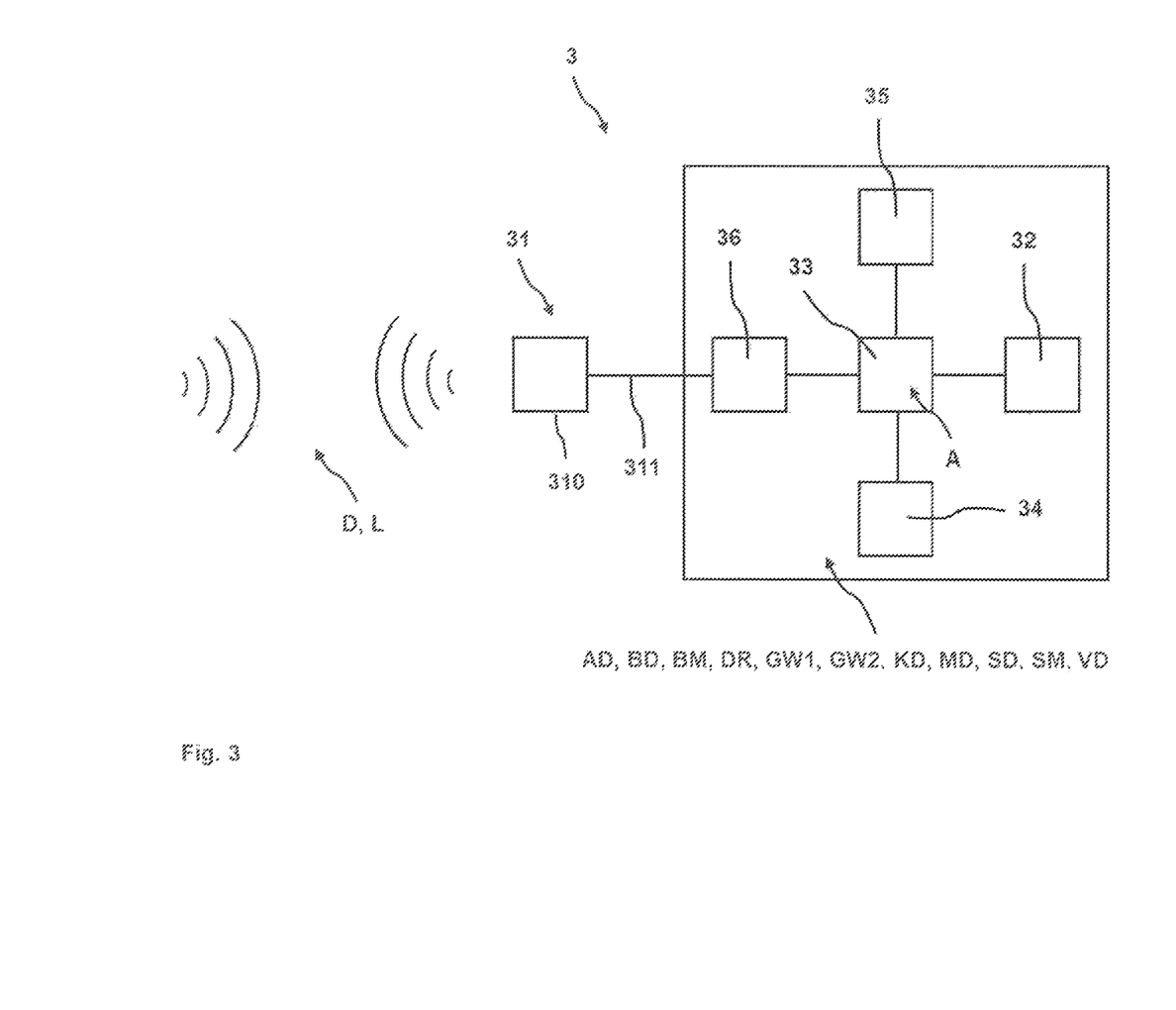
FIG. 3 shows a schematic representation of the evaluation unit 3 of FIG. 1.

The evaluation unit 3 schematically shown in FIG. 1 is configured to evaluate the measured value data PD, the measuring channel data KD, and the measurement range data BD. The evaluation unit 3 is also configured to generate control data SD for controlling the device 2. The control data SD are digital data. Such an evaluation unit 3 marketed by the applicant is the LabAmp type 5165A data acquisition unit according to data sheet 5165A_003-146d-10.20. FIG. 3 schematically shows a detailed view of the evaluation unit 3. The evaluation unit 3 comprises an evaluation transmitting/receiving unit 31, at least an evaluation data memory 32, at least an evaluation data processor 33, at least an input/receiving unit 34, at least an output unit 35, and at least a temporary data memory 36.

The control unit 23 is configured to transmit the data D to the evaluation unit 3 in a wireless manner, and the evaluation unit 3 also is configured to transmit the data D to the control unit 23 in a wireless manner. The wireless data transmission between the control unit 23 and the evaluation unit 3 is bidirectional. In the wireless data transmission, the data D is transmitted and received in the form of electromagnetic waves. For this purpose, the control transmitting/receiving unit 233 comprises an antenna that is configured for transmitting and receiving data D, and the evaluation transmitting/receiving unit 31 comprises an antenna that is configured for transmitting and receiving data D. In FIGS. 1 to 3, the wireless transmission of data D is shown schematically as curved circle segments.

The control unit 23 and the evaluation unit 3 are configured to transmit the data D wirelessly with a transmission power L in the range of 0.1 mW to 10 mW. A range of the wireless transmission of the data D between the control unit 23 and the evaluation unit 3 is less than or equal to 10 m.

In a presently preferred embodiment, the evaluation transmitting/receiving unit 31 is arranged in a separate housing 310 formed as a connector. In the sense of the invention, the adjective "separate" means that the housing 310 is spatially separated from a housing of the evaluation unit 3. The housing of the evaluation unit 3 includes an interface such as a Universal Serial Bus (USB), etc. The evaluation transmitting/receiving unit 31 may be connected in an electrical and mechanical manner to the evaluation unit 3 via the interface. Via the interface, the evaluation transmitting/receiving unit 31 transmits received data D to the evaluation unit 3 and is supplied with electric power by the evaluation unit 3. For this purpose, the evaluation transmitting/receiving unit 31 is for example connected to the interface in the housing of the evaluation unit 3 via an electric line 311.

The data D sent from the control transmitting/receiving unit 233 to the evaluation transmitting/receiving unit 31 include the following categories: connection data VD, measured value data MD, measuring channel data K, and measurement range data BD. The evaluation transmitting/receiving unit 31 receives the data D from the control transmitting/receiving unit 233. The data D sent from the evaluation transmitting/receiving unit 31 to the control transmitting/receiving unit 233 include the following categories: connection data VD and control data SD. The control transmitting/receiving unit 233 receives the data D from the evaluation transmitting/receiving unit 3.

In the evaluation unit 3, at least one evaluation program A is stored in the evaluation data memory 32 and may be loaded into the evaluation data processor 33. The evaluation program A loaded into the evaluation data processor 33 generates commands, which commands are automatically executed by the evaluation unit 3. In the sense of the invention, the adverb "automatically" means that the commands generated by the evaluation program A are executed by the evaluation unit 3 without involvement of a human being.

The evaluation unit 3 may be operated by the input/receiving unit 34. In the sense of the present invention, the verb "operate" means that a human being may enter commands via the input/receiving unit 34, which commands are executed by the evaluation unit 3. The input/receiving unit 34 may be a keyboard for inputting commands, an antenna for receiving commands, etc. Commands are entered as a character string via the keyboard for which the evaluation unit 3 generates control data SD. Via the antenna, the commands are received as electromagnetic waves for which the evaluation unit 3 generates control data SD. The output unit 35 may be a display screen on which data may be graphically displayed to a human being. Thus, evaluated data D may be graphically displayed on the output unit 35.

In a presently preferred embodiment, the control unit 23 and the evaluation unit 3 transmit the data D in a wireless manner in the Industrial Scientific and Medical (ISM) band from 2.402 GHz to 2.480 GHz.

In a presently preferred embodiment, the control unit 23 and the evaluation unit 3 transmit the data D in the ISM band in a plurality of transmission channels in a wireless manner. Thus, the control unit 23 and the evaluation unit 3 use 40 transmission channels in the ISM band of which each individual transmission channel has a bandwidth of 2 MHz.

Prior to a wireless transmission of data D, the control unit 23 and the evaluation unit 3 establish a connection. Three of the 40 transmission channels are registration channels. In the three registration channels, the control transmitting/receiving unit 233 and the evaluation transmitting/receiving unit 31 transmit and receive connection data VD for establishing a connection. This is done according to the master/slave principle. Either the control transmitting/receiving unit 233 or the evaluation transmitting/receiving unit 31 sends a request for a connection setup via connection data VD and thus is the master. The requested control transmitting/receiving unit 233 or evaluation transmitting/receiving unit 31 receives the connection data VD for requesting a connection setup, and is the slave. The slave sends a confirmation of connection establishment to the master via connection data VD. The master receives the confirmation of connection establishment from the slave.

37 of the 40 transmission channels are data channels through which the wireless transmission of data D occurs after the successful establishment of a connection. The control transmitting/receiving unit 233 and the evaluation transmitting/receiving unit 31 transmit and receive the data D as the master and slave. The master transmits packets in the 37 data channels, and the slave receives packets in the 37 data channels. 296 bits to 2040 bits of data D are sent and received per packet.

To avoid interference between packets, the control transmitting/receiving unit 233 and the evaluation transmitting/receiving unit 31 are configured to use a frequency hopping method or frequency hopping spread spectrum (FHSS) and switch to another of the 37 transmission channels after each wireless transmission of a packet.

The control unit 23 and the evaluation unit 3, respectively, monitors whether all packets to be transmitted in a wireless manner have actually been wirelessly transmitted. For this purpose, each packet has a packet identification number. For each packet received by the master, the slave reads the packet identification number and sends connection data VD containing a confirmation of receipt to the master. The confirmation of receipt includes the packet identification number of the received packet. The master receives the connection data VD with the confirmation of receipt and reads the packet identification number of the received packet. For packets which have not been wirelessly transmitted, wireless transmission is repeated by the slave. For this purpose, the master maintains a list of packet identification numbers of packets that it sent and a list of packet identification numbers of packets received from the slave. The master is configured to compare the two lists. The master repeats transmission to the slave of packets sent by the master for which no packet identification numbers of packets received by the slave are revealed by the comparison of the sent and received lists.

Thus, the evaluation unit 3 is configured to generate control data SD for driving the device 2 upon command of the evaluation program A or upon command of the input/receiving unit 34. The control data SD executes a variety of commands. Thus, the control data SD can be used to start or stop the device 2. For this purpose, the evaluation unit 3 is configured to generate control data SD with start or stop information and to transmit the control data SD to the control unit 23. For this purpose, the evaluation transmitting/receiving unit 31 is configured to transmit the control data SD with the start or stop information to the control transmitting/receiving unit 233. The control transmitting/receiving unit 233 is configured to receive the control data SD with the start or stop information. The control unit 23 is configured to start or stop the device 2 according to the start or stop information of the control data SD.

In a presently preferred embodiment, the control unit 23 and the evaluation unit 3 are configured to transmit the data D in a wireless manner at a data transmission rate DR of optionally 1 Mbit/sec or 2 Mbit/sec. The evaluation unit 3 is configured to select a data transmission rate DR, at which selected data transmission rate DR the wireless transmission of the data D is performed.

In a presently preferred embodiment, the evaluation unit 3 is configured to determine already during establishment of the connection for wireless transmission of the data D, which amount of data D is likely to be transmitted wirelessly by the device 2. In a presently preferred embodiment, the evaluation unit 3 is configured to determine an average data transmission rate from the last wireless transmissions of data D. Then, the evaluation unit 3 selects from the two data transmission rates DR, the data transmission rate that satisfies the average data transmission rate. If both data transmission rates DR satisfy the average data transmission rate, then the evaluation unit 3 will select the lower data transmission rate DR of 1 Mbit/sec. The evaluation unit 3 is configured to wirelessly transmit the connection data VD while indicating the selected data transmission rate DR to the control unit 23. For this purpose, the evaluation transmitting/receiving unit 31 is configured to wirelessly transmit connection data VD while indicating the selected data transmission rate DR to the control transmitting/receiving unit 233. The control transmitting/receiving unit 233 is configured to receive the connection data VD indicating the selected data transmission rate DR. The control transmitting/receiving unit 233 then transmits the measured value data MD at the selected data transmission rate DR to the evaluation transmitting/receiving unit 31.

In a presently preferred embodiment, the control unit 23 is configured with the capability for compressing digitized data. Accordingly, after digitizing the measured values P into measured value data MD, the control unit 23 desirably performs a compression of the measured value data MD. The compression of the measured value data MD preferably removes redundant information in the measured value data MD. The compression reduces the amount of the measured value data MD so that only a reduced amount of measured value data MD needs to be transmitted to the evaluation unit 3 in a wireless manner. The control transmitting/receiving unit 233 is configured to transmit the compressed measured value data MD to the evaluation transmitting/receiving unit 31.

In a presently preferred embodiment, after digitizing the measured values P into measured value data MD, the control unit 23 does not carry out calibration of the measured value data MD. Ordinarily, the calibration would serve the purpose of correcting the linearity error of the measured values P. However, electric polarization charges P1-P4 of piezoelectric transducers normally exhibit a linearity error that is only 10% after all. The control transmitting/receiving unit 233 is configured to send non-calibrated measured value data MD to the evaluation transmitting/receiving unit 31.

The evaluation unit 3 stores data D which have been wirelessly transmitted by the control unit to the temporary data memory 36 schematically shown in FIG. 3. In a presently preferred embodiment, the evaluation unit 3 stores data D which have been wirelessly transmitted by the control unit 23, such as measured value data MD, measuring channel data KD, and measurement range data BD, in the temporary data memory 36. In a presently preferred embodiment, the temporary data memory 36 is configured to be sufficiently large so that even at a data transmission rate DR of 2 Mbit/sec, the temporary data memory 36 is filled with data D only after a filling time of several 0.1 sec. In this way, the evaluation unit 3 may select to read out the data D stored in the temporary data memory 36 in a buffer mode BM or in a streaming mode BM. In the buffer mode BM, the evaluation unit 3 temporarily stores the data D in the temporary data memory 36. The temporary data memory 36 is operated like a shift register from which the data D is read out according to the First In-First Out principle. Thus, in the buffer mode BM the control unit 23 has the opportunity to repeat the transmission of data D that has not been wirelessly transmitted. In the streaming mode SM, the evaluation unit 3 reads out the data D immediately after they were stored in the temporary data memory 36. In the streaming mode SM, the evaluation unit 3 may perform immediate evaluation of the data D which is particularly important in machine tool 1 control processes where the evaluation unit 3 permanently monitors a deviation from an average force value or exceeding a predefined set value, and fast control is advantageous.

After wireless transmission, a decompression of the measured value data MD is performed in the evaluation unit 3. The evaluation unit 3 is configured to decompress the measured value data MD loaded into the evaluation data processor 33. During decompression, the evaluation unit 3 adds back redundant information removed in the measured value data MD. The evaluation unit 3 is configured to store the decompressed measured value data MD in the evaluation data memory 32.

The evaluation unit 3 is configured to perform a calibration of the measured value data PD after having received wireless transmission of the measured value data PD. For this purpose, calibration data AD are stored in the evaluation data memory 32 schematically shown in FIG. 3. The calibration data AD are specific for each of the measuring channels K1-K4. The calibration data AD have been generated in a separate calibration process. During the calibration process, the measured values P of the measuring unit 22 are compared with measured values of a reference transducer for each measuring channel K1-K4. The result of the comparison is stored as calibration data AD in the data memory 33 schematically shown in FIG. 3. Such a calibration process desirably is performed at time intervals of one or two years.

The evaluation unit 3 loads calibration data AD from the evaluation data memory 32 into the evaluation data processor 33. The evaluation unit 3 assigns the calibration data KD to the measured value data MD and measured channel data KD. The evaluation unit 3 calibrates the measured value data MD specifically for each measuring channel K1-K4 with the assigned calibration data AD. For example, when calibrating the measured value data MD with assigned calibration data AD specifically for each measuring channel K1-K4, the evaluation unit 3 performs a multiplication of individual measured value data MD with individual calibration data AD. By the calibration, the linearity error of the measured values P is corrected. In a presently preferred embodiment, for piezoelectric transducers which generate measured values P in the form of electric polarization charges P1-P4, the linearity error of the electric polarization charges P1-P4 is thus corrected by the calibration. The calibrated measured value data MD have a linearity error of less than or equal to 1%.

The calibrated measured value data MD correspond to the force component types Fx, Fy, Fz in a plurality of measurement ranges with final values from 500N to 20 kN with an accuracy of less than or equal to 4%. In the measurement ranges with final values from 500N to 20 kN, the calibrated measured value data MD resolve the component types Fx, Fy, Fz of the force with an accuracy of 0.5 mV/N to 4 mV/N. The calibrated measured value data MD correspond to the torque component type Mz in a plurality of measurement ranges with final values from 10 Nm to 100 Nm with an accuracy of less than or equal to 2%. In the measurement ranges with final values from 10 Nm to 100 Nm, the calibrated measured value data MD resolve the torque component type Mz with an accuracy from 0.1V/Nm to 1V/Nm.

The evaluation unit 3 is configured to store the calibrated measured value data MD in the evaluation data memory 32.

The device 2 may be operated with an adjustable number of measuring channels K1-K4 for adjustable component types Fx, Fy, Fz, My of force and torque. For this purpose, the measuring unit 22 is configured to permit adjustment of the number of measuring channels K1-K4 in which the measuring unit 22 generates measured values P may be set. In addition, the component types Fx, Fy, Fz, Mz of force and torque for which the measuring unit 22 generates measured values P may also be set. In a presently preferred embodiment, the measuring unit 22 is configured to generate measured values P for: one of the four component types Fx, Fy, Fz, Mz of force and torque in one of the four measuring channels K1-K4, or two of the four component types Fx, Fy, Fz, Mz of force and torque in two of the four measuring channels K1-K4, or three of the four component types Fx, Fy, Fz, Mz of force and torque in three of the four measuring channels K1-K4, or all four component types Fx, Fy, Fz, Mz of force and torque in all four measuring channels K1-K4.

In a presently preferred embodiment, the input/receiving unit 34 and the evaluation unit 3 cooperate to perform the setting of the number of measuring channels K1-K4 and component types Fx, Fy, Fz, Mz of force and torque. From the input/receiving unit 34, the evaluation unit 3 is configured to receive the command to operate the device 2 with measuring channels K1-K4 to be set for component types Fx, Fy, Fz, Mz of force and torque to be set. The evaluation unit 3 is configured to generate control data SD with an information on the measuring channels K1-K4 to be set and the component types Fx, Fy, Fz, Mz of force and torque to be set for operating the device 2. The evaluation unit 3 is configured to transmit the control data SD with the information on the measuring channels K1-K4 to be set of the component types Fx, Fy, Fz, Mz of force and torque in a wireless manner to the control unit 23 schematically shown in FIG. 2. For this purpose, the evaluation transmitting/receiving unit 31 schematically shown in FIG. 2 desirably is configured to transmit the control data SD with the information on the measuring channels K1-K4 to be set of the component types Fx, Fy, Fz, Mz of force and torque to be set to the control transmitting/receiving unit 233 schematically shown in FIG. 2. The control transmitting/receiving unit 233 is configured to receive the control data SD with the information on the measuring channels K1-K4 to be set of the component types Fx, Fy, Fz, Mz of force and torque to be set. The control unit 23 schematically shown in FIG. 2 desirably is configured to operate the device 2 schematically shown in FIG. 1 with the measuring channels K1-K4 to be set of the component types Fx, Fy, Fz, Mz of force and torque to be set.

The control data SD with the information on the measuring channels K1-K4 of the component types Fx, Fy, Fz, Mz of force and torque to be set thus specifies for the operator of the system 100 in how many and in which measuring channels K1-K4 the device 2 measures force and torque. For example, for a process of chip-removing machining of the workpiece 0, such as drilling, two measuring channels K3, K4 for the two component types of the force Fz along the axis of rotation Z and the torque Mz about the axis of rotation Z are sufficient for monitoring drilling quality. On the other hand, for chip-removing machining of the workpiece 0, such as milling, four measuring channels K1-K4 for all four component types of force Fx, Fy, Fz and torque Mz are necessary for monitoring milling quality. The operator of the system 100 may acquire a license from the manufacturer of the device 2 and evaluation unit 3 stating by how many and which measuring channels K1-K4, the device 2 measures force and torque. A license including only two measuring channels K3, K4 for chip-removing machining of the workpiece 0 by drilling is less expensive than a license including all four measuring channels K1-K4 for chip-removing machining of the workpiece 0 by milling. The license of the operator of the system 100 provides access to control data SD indicating the measuring channels K1-K4 to be set of the component types Fx, Fy, Fz, Mz of force and torque to be set.

The evaluation unit 3 is configured to generate control data SD with an information on the measurement range B to be set upon command of the evaluation program A or upon command of the input/receiving unit 34.

This is due to the fact that the amplified measured values V are in a measurement range B. To include the amplified measured values V in a measurement range B enabling the best possible representation, the evaluation unit 3 is configured to monitor whether the amplified measured values V are within predefined threshold values GW1, GW2 of the measurement range B. Each measurement range B has a highest value or final value (full scale). For best possible representation, the amplified measured values V should not exceed the final value, and they should not be more than one order of magnitude lower than the final value. However, the measurement value-to-noise ratio varies in the different measurement ranges B to a different extent. The larger the measurement range B, then the larger the measurement value-to-noise ratio. Furthermore, the linearity error is different in the different measurement ranges B. Therefore, a first threshold value GW1 is equal to 90% of the final value, and a second threshold value GW2 thus is equal to 10% of the final value. If the amplified measured values V are not located within the predefined threshold values GW1, GW2 of the measurement range B, the evaluation unit 3 is configured to set another measurement range B in which the amplified measured values V are within the predefined threshold values GW1, GW2 of the measurement range B. Alternatively, the input/receiving unit 34 is configured to instruct the evaluation unit 3 to set a specific measurement range B.

The evaluation unit 3 is configured to generate control data SD with information on the measurement range B to be set. The evaluation unit 3 is configured to wirelessly transmit the control data SD with the information on the measurement range B to be set to the testing device 23. And the testing device 3 is configured to set the measurement range B to be set and to convert the measured values P into amplified measured values V within the set measurement range B.

LIST OF REFERENCE NUMERALS

0 work piece
1 machine tool
11 tool
12 spindle
100 system
2 device
20 housing
21 tool adapter
22 measuring unit
23 control unit
231 control converting unit
232 control analog/digital converting unit
233 control transmitting/receiving unit
234 control data memory
235 control data processor
24 energy storage unit
25 spindle adapter
3 evaluation unit
31 evaluation transmitting/receiving unit
32 evaluation data memory
33 evaluation data processor
34 input/receiving unit
35 output unit
36 temporary data memory
310 housing
311 electric line
A evaluation program
B measurement range
AD calibration data
BD measurement range data
BM buffer mode
DR data transmission rate
GW1, GW2 threshold value
K control program KD measuring channel data
K1-K4 measuring channel
P measured values
P1-P4 electric polarization charges
Fx, Fy, Fz component type of the force
L transmission power
MD measured data
Mz component type of the torque
SD control data
SM streaming mode
V amplified measured values
V1-V4 electric voltages
VD connection data
X longitudinal axis
Y transverse axis
Z axis of rotation

What is claimed is:

1. A system for chip-removing machining of a workpiece and for measuring and evaluating force and torque during chip-removing machining of the workpiece, the system comprising:
a machine tool configured for chip-removing machining of the workpiece and defining an axis of rotation;
a tool disposed for operation by the machine tool during chip-removing machining of the workpiece;
a device installed in the machine tool and configured for rotation about the axis of rotation during chip-removing machining by the tool;
wherein the device includes a measuring unit that includes a plurality of piezoelectric transducers and a plurality of measuring channels;
wherein each of the plurality of piezoelectric transducers is configured to generate measured values in the form of electric polarization charges under the action of component types of force and torque during chip-removing machining of the workpiece by the tool and accordingly generate measured value data indicative of the generated measured values;
wherein each of the plurality of piezoelectric transducers is configured to operate at a sampling rate in a range of 5 kHz to 10 kHz;
wherein each of the plurality of measuring channels being independent of each other of the plurality of measuring channels;
wherein a respective one of the plurality of measuring channels being individually and exclusively assigned to a respective one of the plurality of piezoelectric transducers;
an evaluation unit connected to the device and disposed stationary with respect to the device, wherein the evaluation unit is configured to evaluate force and torque from the measured value data generated by the device, wherein the evaluation unit is configured to generate control data for the machine tool based at least in part on the measured value data generated by the device, wherein the evaluation unit is configured to transmit the control data to a control unit;
wherein the device includes a control unit that is configured to transmit with a transmission power in the range from 0.1 mW to 10 mW the control data in a wireless transmission directly to the machine tool to modify operation of the machine tool.

2. The system according to claim 1, wherein the control unit is configured to transmit measured value data as binary number sequences with a resolution of 16 bit.

3. The system according to claim 1, wherein the control unit is configured to transmit the wireless transmission of the measured value data at a selected data transmission rate of 1 Mbit/sec or 2 Mbit/sec; and wherein the evaluation unit is configured to select a data transmission rate for the wireless transmission of the measured value data.

4. The system according to claim 3, wherein the evaluation unit is configured to wirelessly transmit connection data and indicate the selected data transmission rate to the control unit; and wherein the control unit is configured to wirelessly transmit the measured value data at the selected data transmission rate to the evaluation unit.

5. The system according to claim 1, wherein the evaluation unit includes an evaluation transmitting/receiving unit that includes an antenna configured to receive the measured value data from the control unit in the form of electromagnetic waves; wherein the evaluation transmitting/receiving unit is disposed in a housing that is spatially remote from the machine tool and selectively disposable to become aligned with respect to the control unit for wireless transmission of the measured value data.

6. The system according to claim 1, wherein the evaluation unit includes a temporary data memory that is configured to store measured value data that has been wirelessly transmitted by the control unit; and wherein the evaluation unit is configured to read out the temporary data memory in a buffer mode or in a streaming mode.

7. The system according to claim 1, wherein the control unit is configured to compress the measured value data before the measured value data are transmitting to the evaluation unit in a wireless manner; and wherein the evaluation unit is configured to decompress the measured value data after wireless transmission.

8. The system according to claim 7, wherein the control unit is configured to remove redundant information from the measured value data during compression of the measured value data; and wherein the control unit is configured to add back the removed redundant information to the measured value data during decompression of the measured value data.

9. The system according to claim 1, wherein the control unit is configured to wirelessly transmit the measured value data to the evaluation unit without calibrating the measured value data; wherein the evaluation unit is configured to store calibration data that correct a linearity error of the measured values; and wherein the evaluation unit is configured to calibrate the wirelessly transmitted measured value data with the calibration data.

10. The system according to claim 9, wherein the measuring unit is configured to generate measured values in a plurality of measuring channels; wherein calibration data are specific for each of the plurality of measuring channels; wherein the control unit is configured to generate measuring channel data which unequivocally designate the measuring channel in which the measuring unit has generated measured values; wherein the control unit is configured to transmit the measuring channel data to the evaluation unit in a wireless manner; wherein the evaluation unit is configured to assign the calibration data to the measured value data and to the measuring channel data; and wherein the evaluation unit is configured to calibrate the measured value data specifically for each measuring channel with the assigned calibration data.

11. The system according to claim 10, wherein the evaluation unit is configured to perform a multiplication of individual measured value data with associated individual calibration data when calibrating the measured value data with the associated calibration data.

12. The system according to claim 1, wherein the measurement unit is configured to set a number of the measuring channels in which the measurement unit generates measured values; wherein the measurement unit is configured to set the component types of force and torque for which the measuring unit generates measured values; and wherein the evaluation unit is configured to control the number of measuring channels and the component types of force and torque that are set by the evaluation unit.

13. The system according to claim 12, wherein the evaluation unit is configured to generate control data, which includes information on the measuring channels to be set and the components types of force and torque to be set, for setting the number of measuring channels and component types of force and torque; wherein the evaluation unit is configured to wirelessly transmit the control data with the information on the measuring channels to be set of the component types of force and torque to be set to the control unit; wherein the control unit is configured to operate the device according to the information on the measuring channels to be set of the component types of force and torque to be set.

14. The system according to claim 1, wherein the control unit is configured to convert the measured values into amplified measured values of a measurement range; wherein the evaluation unit is configured to generate control data including an information on the measurement range to be set by the testing device; wherein the evaluation unit is configured to wirelessly transmit the control data with the information on the measurement range to be set to the testing device; and wherein the testing device is configured to set the measurement range to be set according to the information and to convert the measured values into the set measurement range.

15. The system according to claim 14, wherein the control unit is configured to generate measurement range data which unequivocally designates the measurement range of the amplified measured values; wherein the control unit is configured to transmit wirelessly to the evaluation unit, the amplified measured values as measured value data and the measurement range data; wherein the evaluation unit is configured to monitor whether the amplified measured values are within predefined threshold values of the measurement range; wherein the evaluation is configured so that if the amplified measured values are not within the predefined threshold values of the measurement range, then the evaluation unit sets another measurement range in which the amplified measured values are within predefined threshold values of the measurement range; wherein the evaluation unit is configured to generate control data including information on the measurement range to be set; wherein the evaluation unit is configured to transmit the control data with the information on the measurement range to be set in a wireless manner to the testing device; and wherein the testing device is configured to set the measurement range to be set and to convert the measured values into the set measurement range.

* * * * *